United States Patent
De Wergifosse

(10) Patent No.: US 11,988,152 B2
(45) Date of Patent: May 21, 2024

(54) TURBOMACHINE COMPRISING AN ELECTRIC MACHINE HAVING A STARTER-GENERATOR FUNCTION, AND METHOD FOR CONTROLLING THE SPEED OF SUCH AN ELECTRIC MACHINE

(71) Applicant: SAFRAN AIRCRAFT ENGINES, Paris (FR)

(72) Inventor: Huguette De Wergifosse, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 86 days.

(21) Appl. No.: 17/618,684

(22) PCT Filed: Jul. 16, 2020

(86) PCT No.: PCT/FR2020/051292
§ 371 (c)(1),
(2) Date: Dec. 13, 2021

(87) PCT Pub. No.: WO2021/019144
PCT Pub. Date: Feb. 4, 2021

(65) Prior Publication Data
US 2022/0243663 A1   Aug. 4, 2022

(30) Foreign Application Priority Data
Jul. 26, 2019  (FR) ........................... 1908561

(51) Int. Cl.
*F02C 7/36* (2006.01)
*F02C 7/268* (2006.01)
*F16H 57/08* (2006.01)

(52) U.S. Cl.
CPC ................ *F02C 7/36* (2013.01); *F02C 7/268* (2013.01); *F16H 57/082* (2013.01);
(Continued)

(58) Field of Classification Search
CPC .......... F02C 7/36; F16H 57/082; F16H 3/727; F05D 2260/40311; F05D 2220/76; F01D 15/10
See application file for complete search history.

(56) References Cited

U.S. PATENT DOCUMENTS

| | | | | |
|---|---|---|---|---|
| 2012/0319661 A1* | 12/2012 | Moore | ....................... | H02P 9/08 322/40 |
| 2013/0247539 A1* | 9/2013 | Hoppe | ....................... | F02C 7/32 60/39.15 |
| 2020/0248632 A1* | 8/2020 | Leque | ..................... | F02C 7/275 |

FOREIGN PATENT DOCUMENTS

| EP | 2 103 795 A2 | 9/2009 |
|---|---|---|
| EP | 3 382 183 A1 | 10/2018 |

(Continued)

OTHER PUBLICATIONS

International Search Report dated Nov. 10, 2020, issued in corresponding International Application No. PCT/FR2020/051292, filed Jul. 16, 2020, 5 pages.

(Continued)

*Primary Examiner* — David P. Olynick
(74) *Attorney, Agent, or Firm* — CHRISTENSEN O'CONNOR JOHNSON KINDNESS PLLC

(57) ABSTRACT

A turbomachine has an electric machine, and a starter-generator incorporating a second electric machine configured to operate as a starter and a generator. The electric machine and the generator-starter are arranged to transfer electric power between them. A planetary gear reduction device has a first element coupled to an accessory relay housing, a second element coupled to the starter-generator, a third element rotated by the electric machine, control means configured to modify the speed of rotation of the first electric machine and the starter-generator so as to provide the starter-generator with a maximum torque in starter mode.

(Continued)

The planetary gear reduction device also modifies the speed of rotation of the first electric machine such that the starter-generator is driven at a constant speed in generator mode.

10 Claims, 5 Drawing Sheets

(52) U.S. Cl.
  CPC .. *F05D 2220/7644* (2013.01); *F05D 2240/60* (2013.01); *F05D 2260/40311* (2013.01); *F05D 2270/023* (2013.01)

(56) References Cited

FOREIGN PATENT DOCUMENTS

| | | |
|---|---|---|
| FR | 3 062 424 A1 | 8/2018 |
| GB | 2461973 A | 1/2010 |

OTHER PUBLICATIONS

Written Opinion dated Nov. 10, 2020, issued in corresponding International Application No. PCT/FR2020/051292, filed Jul. 16, 2020, 5 pages.

English translation of Written Opinion dated Nov. 10, 2020, issued in corresponding International Application No. PCT/FR2020/051292, filed Jul. 16, 2020, 5 pages.

International Preliminary Report on Patentability dated Feb. 1, 2022, issued in corresponding International Application No. PCT/FR2020/051292, filed Jul. 16, 2020, 6 pages.

* cited by examiner

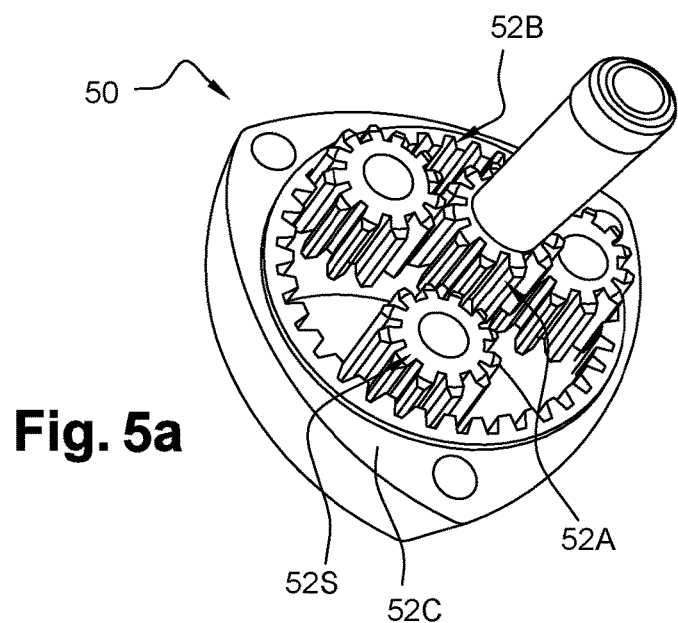
Fig. 5a
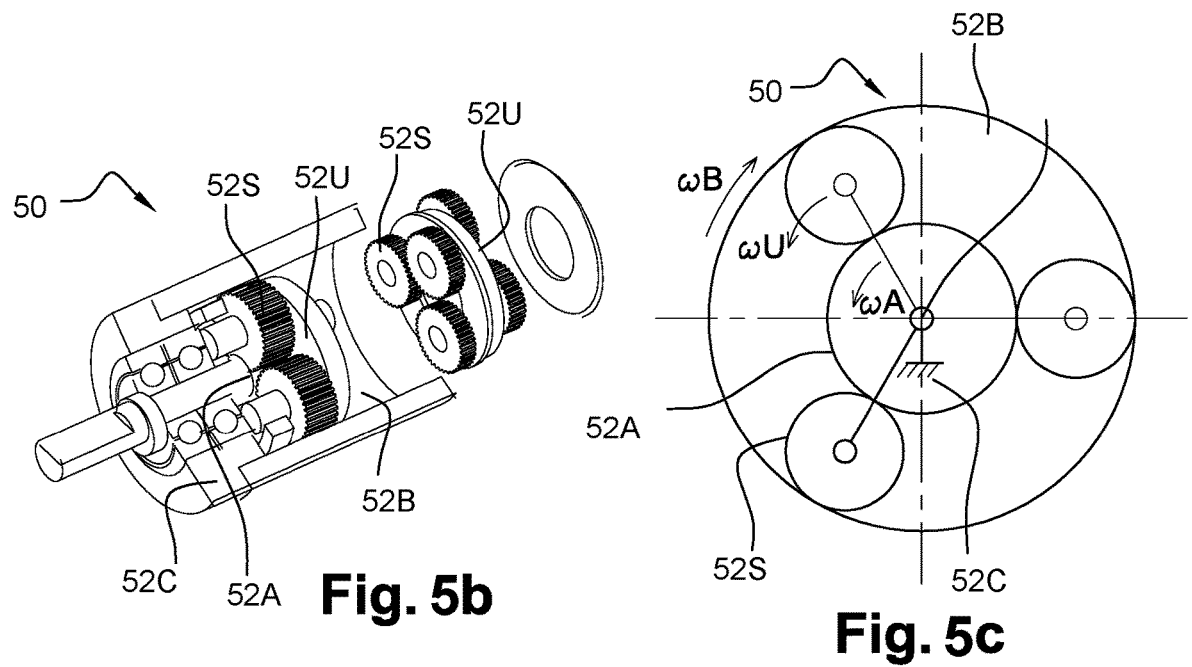
Fig. 5b
Fig. 5c

TURBOMACHINE COMPRISING AN ELECTRIC MACHINE HAVING A STARTER-GENERATOR FUNCTION, AND METHOD FOR CONTROLLING THE SPEED OF SUCH AN ELECTRIC MACHINE

FIELD OF THE DISCLOSURE

The disclosure relates to the field of turbomachines, and more specifically to a turbomachine comprising an electric machine having motor, starter and generator functions. The disclosure also relates to a method for controlling the speed of the electric machine of the turbomachine.

BACKGROUND

The prior art comprises, in particular, the documents EP3382183A1, EP2103795A2, EP2103795A3, GB2461973A and FR3062424A1.

In a known way, a turbomachine installed on an aircraft is equipped with a generator, and more precisely with an Integrated Drive Generator (IDG), configured to provide an electrical power at a constant frequency, for example an electrical power of 115 V in three-phase alternative current at 400 Hz.

The generator is designed to receive mechanical energy through the rotation of its input shaft at different rotational speeds, and to transform this mechanical energy into electrical energy. Typically, the generator is driven by an output shaft of an accessory gear box (AGB), on the turbomachine. The speed of rotation of the input shaft of the generator and the output speed of the accessory gear box are therefore linked by a fixed reduction ratio to the variable speeds of the turbomachine. To obtain a constant frequency, the generator must be driven at a constant speed. For this purpose, a device for controlling the speed between the output shaft of the accessory gear box and the input shaft of the generator can be installed, in order to maintain a constant speed of the rotation axis of the generator.

In particular, a generator providing an electrical power at a constant frequency may be equipped with a hydromechanical differential device to ensure a control of the constant speed of the generator.

The control device of the speed usually consists of a fixed displacement hydraulic motor. The speed of the hydraulic motor is controlled by a pressure control loop. The transfer of the hydraulic power is achieved by a variable displacement hydraulic motor, where the displacement is adjusted to ensure the conservation of the flow rate between the two equipment. For the pressure control, the hydraulic system is equipped with a dissipative pressure controller.

However, the mechanical power drawn from the accessory gear box is not equal to the power provided by the generator.

In addition, the hydromechanical device has disadvantages. In particular, the overall efficiency of the fixed or variable displacement hydraulic motor is low, and in particular close to 80%, due to internal leaks and friction. In addition, there are pressure losses at the level of the hydraulic device controlling the variable displacement hydraulic motor and dissipative losses at the level of the pressure controller controlling the speed of the fixed displacement hydraulic motor. Furthermore, the reversible operation in both quadrants, i.e. with a positive and negative speed of the motor-generator, does not allow an optimization in terms of efficiency, and therefore the efficiency is lower than 80%. This hydromechanical device is also unreliable because adjusting the speed of the generator involves operating the hydraulic motors over a wide speed range. Thus, at low or high speeds, the efficiencies are affected and the risk of wear is greater.

It is known that a turbomachine is also equipped with a starter, for example pneumatic or electric. A starter is configured to provide a high torque during the ground starting phase and during the flight assistance phase of the turbomachine. The torque of the starter allows to overcome the overall value of the torques at the high pressure shaft from both the turbomachine and all the accessories driven through a mechanical transmission by the turbomachine during the start-up phase, where only the starter provides the torque. From the engine ignition, at about 25% of the speed of the turbomachine, both the starter and the motor provide an engine torque.

The torque to be provided up to 25% of the speed of the turbomachine can be very high because of the torques linked to the accessories, or simply because of the own inertia of the turbomachine.

The generator may be operated as an electric starter, in particular by means of an appropriate power supply by means of coils connected to the generator. However, the size of the generator is determined by its maximum torque. However, in most applications, the maximum torque to be provided by the starter up to 25% of the speed of the turbomachine is almost double the torque provided by the turbomachine in generator mode.

At present, constant speed starter-generator systems allow to achieve the required starting torque without impacting the size of the generator thanks to a mechanical system for uncoupling the accessories during the starting phase. This system involves the integration of an additional differential to the hydromechanical differential device. During the starting phase, an active brake releases the accessories which are no longer driven by the starter. At the end of the starting phase, the brake is deactivated and the accessories are driven by the output shaft of the accessory gear box of the turbomachine.

However, this system comprises an electromagnetic brake that can cause a dormant failure.

On the other hand, the additional torque to be provided by the starter during the starting phase is not necessarily linked to the accessories but also to the inertia of the turbomachine. In this case the system for uncoupling the accessories does not meet the need for high torque at startup.

Thus, this system is complex and not reliable enough, in particular because of the electromechanical braking system.

An alternative would be to double the size of the generator to develop twice the torque in starter mode. However, this alternative poses cluttering problems within the turbomachine.

The purpose of the disclosure is to propose a solution allowing to remedy at least some of these disadvantages.

In particular, the present disclosure proposes a drive mode allowing to increase the starting torque without impacting the size of the generator, and without adding components other than those already present to ensure the operation of the generator at constant speed.

SUMMARY

To this end, the disclosure relates to a turbomachine, in particular for an aircraft, comprising:
an accessory gear box,
a first electric machine, a starter-generator integrating a second electric machine configured to operate in starter mode and in generator mode, the first electric machine and the starter-generator integrating the second electric machine being arranged to transfer electrical power from one to the other, control means configured to control the first electric machine and the starter-generator, and an epicyclic reduction gear train comprising three elements, a central planetary gear, an external ring gear and a planet carrier whose planet gears mesh with the planetary gear and the ring gear, the three elements being rotatable about an axis of the gearbox, a first of the three elements being intended to be coupled to the accessory gear box, a second of the three elements being intended to be coupled to the starter-generator integrating the second electric machine, a third of the three elements being driven in rotation by the first electric machine, wherein the control means are configured to modify the speed of rotation of the first electric machine and the starter-generator integrating the second electric machine so as to provide the starter-generator in starter mode with a maximum torque, and wherein the control means are configured to modify the speed of rotation of the first electric machine so that the starter-generator in generator mode is driven in rotation at a constant speed.

The second electric machine may be independent or part of the starter-generator.

The control means may therefore be configured to control the first electric machine, the second electric machine and the starter-generator.

The second electric machine can be either coupled to the axis of the starter-generator or to the axis of the accessory gear box.

The control means may be configured to modify the speed of rotation of the first electric machine so as to provide the starter-generator in starter mode with maximum torque.

According to an embodiment, the starter-generator integrating the second electric machine is configured to operate in starter mode and in generator mode, and the first electric machine is configured to operate in motor mode and in generator mode. The first and second electric machines thus work in two quadrants, motor and generator.

The first and second electric machines may be arranged to transfer electrical power from one to the other.

The control means may be configured to modify the speed of rotation of the first electric machine so as to provide the starter-generator in starter mode with maximum torque.

The control means may be configured to modify the speed of rotation of the first electric machine so that the starter-generator in generator mode is driven in rotation at a constant speed.

For all the configurations where the second electric machine is positioned on the axis of the starter-generator, the starter-generator can be simplified by integrating the functions of the starter-generator and of the second electric machine.

According to the disclosure, an electric machine is a device configured to work in both the motor and generator quadrants.

A generator is a device configured to convert mechanical energy from the rotation of its input shaft into electrical energy.

A motor-generator machine ensures to performs both the function of motor, i.e. the conversion of electrical energy into mechanical energy, and that of a generator, i.e. the conversion of mechanical energy into electrical energy. Thus, in a motor-generator machine, the function of the motor or of the generator is reversible.

A starter is a device intended to assist in the starting of the turbomachine. The starter is configured to provide electrical energy to drive the turbomachine during the starting phases. The operation of a starter is self-sustaining.

The starter-generator can be used to drive the turbomachine during the starting phases or to generate an electric current when the turbomachine is switched on. The starter-generator functions as an electric motor to provide the torque required to start the turbomachine and then, once the turbomachine is started, as a generator to provide an electric current.

The disclosure thus proposes a turbomachine integrating a device for driving the electric machine in starter-generator mode from the accessory gear box. The driving device comprises the first electric machine, the starter-generator, the second electric machine, the gearbox and the control means.

The driving device according to the disclosure is advantageously purely electrical, which allows to eliminate the dissipative losses present in the driving devices according to the prior art and incorporates an electrical power transfer between the first electric machine and the second electric machine.

As the speed of rotation of the turbomachine, and hence of the starter-generator in generator mode, is generally variable, in order to adjust the output speed of the starter-generator in generator mode to a constant value, the turbomachine comprises an epicyclic reduction gear train to integrate an additional degree of adaptation. The transmission through the epicyclic reduction gear train allows to connect the axis driven by the accessory gear box, the starter-generator and the first electric machine, and thus adjusts the speed of the starter-generator in generator mode to a constant value. The epicyclic reduction gear train behaves like a differential, and allows to link these three equipment and to modulate the speed of the shaft of the first electric machine.

Thus, the control of the speed of the first electric machine allows to ensure a constant output speed of the starter-generator in generator mode for an input speed on the accessory gear box side.

The second electric machine allows to ensure the transfer of electrical power to the first electric machine.

During the starting phase, the torque driving the turbomachine and the accessories is provided by the starter-generator operating in starter mode, and the first and second electric machines operate in motor mode, independently of their positioning in the driving device.

The maximum torque to be developed by the first electric machine and the second electric machine is sufficient to reach the maximum torque required by the starting phase by adding the maximum torque developed by the starter. The maximum speed of the starter-generator is conditioned by the maximum speed in generator mode. Thus, the present disclosure allows to integrate the functionality of the starter with the driving device, while providing a solution to the problem of the high torque to be provided by the starter during the starting phase.

The output speed of the generator is advantageously maintained constant without drawing additional power from the output shaft of the accessory gear box of the turbomachine. Thus, the power drawn from the output shaft of the accessory gear box is integrally converted into electrical power.

The driving device according to the disclosure allows to work in both quadrants, without any penalty in terms of efficiency of the electric machines.

Furthermore, the driving device is reliable, in particular due to the redundancy of the electric machines, in contrast to the devices according to the prior art in which the hydraulic redundancy is not technically conceivable.

In addition, the number of components of the device is limited, as the driving device does not comprise a pressure control device or a displacement control device as in the prior art.

The driving device also has the ability to operate as a starter by developing the maximum torque required at the level of the axis of the turbomachine, without additional machine or an increase of the size of the components.

The epicyclic reduction gear train is arranged between the output shaft of the accessory gear box and the input shaft of the starter-generator in order to maintain a constant speed of the rotation axis of the starter-generator, and more precisely of the generator.

Thus, the present disclosure proposes a differential drive mode between the turbomachine and a starter-generator allowing both an operation of the generator at constant speed and an operation of the starter with a torque equal to twice the torque in generator mode, without impact on the mass of the generator. Moreover, this training mode does not require any uncoupling of the accessories.

The first and second electric machines can be operated as a motor-generator.

Preferably, the first electric machine and the starter-generator integrating the second electric machine or the second electric machine are asynchronous.

The turbomachine may comprise at least one reversible power converter arranged between the first electric machine and the starter-generator integrating the second electric machine or the second electric machine so as to transfer electrical power reversibly from one to the other.

According to a first embodiment, the first of the three elements is the planet carrier, the second of the three elements is the ring gear, and the third of the three elements is the planetary gear.

According to a second embodiment, the first of the three elements is the ring gear, the second of the three elements is the planet carrier, and the third of the three elements is the planetary gear.

According to a third embodiment, the second of the three elements is intended to be coupled to the starter-generator. In this embodiment, the first of the three elements is the planet carrier, the second of the three elements is the ring gear, and the third of the three elements is the planetary gear. In this configuration, the first of the three elements may also be coupled to the second electric machine.

According to a fourth embodiment, the second of the three elements is intended to be coupled to the starter-generator. In this embodiment, the first of the three elements is the ring gear, the second of the three elements is the planet carrier, and the third of the three elements is the planetary gear. In this configuration, the first of the three elements may also be coupled to the second electric machine.

The disclosure also relates to a method for controlling the speed of a starter-generator of a turbomachine according to the disclosure in an aircraft, comprising a step of modifying the speed of the third of the three elements by controlling the first electric machine by means of control means in such a way that the starter-generator integrating the second electric machine in generator mode is driven in rotation at a constant speed.

DESCRIPTION OF THE DRAWINGS

The disclosure will be better understood and other details, characteristics and advantages of the present disclosure will become clearer from the following description made by way of non-limiting example and with reference to the attached drawings, in which:

FIGS. 5a, 5b and 5c represent exploded views and a diagram of an epicyclic reduction gear train of a turbomachine according to the disclosure.

Figure 1A:
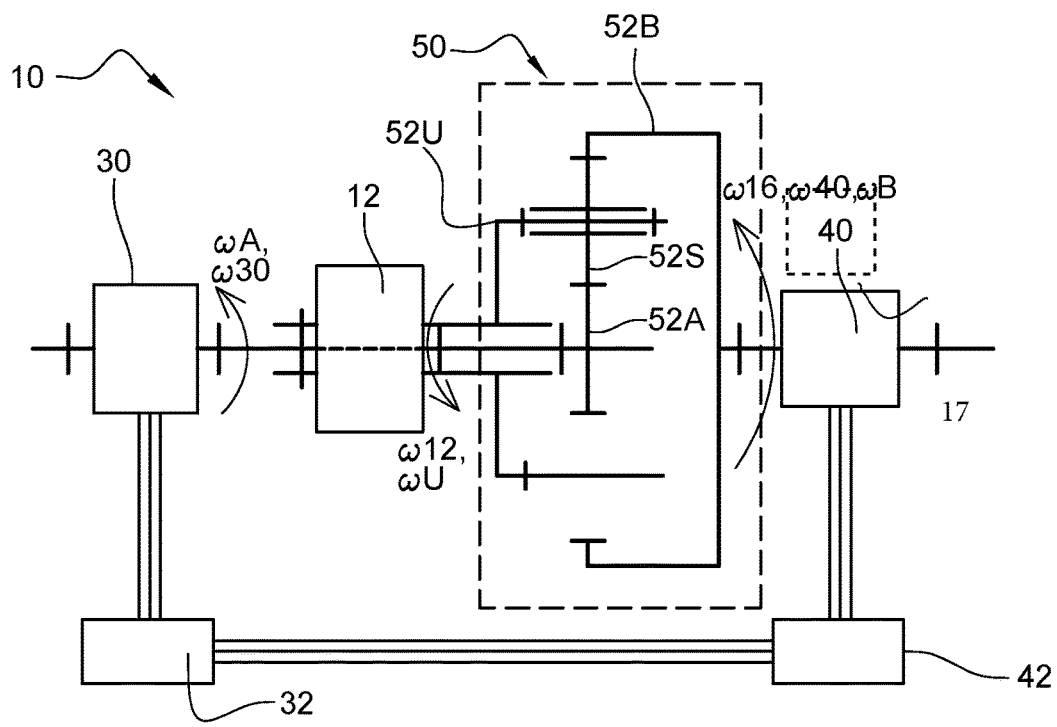
FIGS. 1a and 1b represent very schematically different kinematic configurations of a turbomachine according to a first embodiment of the disclosure.

The elements having the same functions in the different implementations have the same references in the figures.

DETAILED DESCRIPTION

FIGS. 1 to 4 show a turbomachine 10 according to the disclosure.

The turbomachine 10 comprises an accessory gear box 12 which is configured to be driven by a motor axis. The accessory gear box 12 may comprise a plurality of gear trains connected to output shafts for driving various equipment. Here, one of the output shafts 14 of the gearbox drives a starter-generator 16 or a starter-generator 17 integrating a second electric machine 40. The accessory gear box 12 generally acts as a link between the drive axis and the starter-generator, which may be used to drive the turbomachine during starting phases or to generate an electrical current when the turbomachine is switched on.

The speed of the accessory gear box 12 may be a high speed of the order of 20,000 rpm. The starter-generator 17 may be limited to a maximum speed of rotation below the speed of the accessory gear box 12.

The turbomachine 10 comprises a first electric machine 30, and control means configured to control the first electric machine 30. The first electric machine 30 may operate in motor mode or in generator mode. In other words, the first electric machine 30 may be configured to operate in generator mode by providing electrical energy and to operate in motor mode by recovering electrical energy.

The control means are also configured to control the starter-generator 17.

The first electric machine 30 and the electric machine 17 or the second electric machine 40 are arranged to transfer electrical power from one to the other.

Preferably, the first electric machine 30, the second electric machine 40 and the starter-generator 17 are asynchronous in alternative current.

The turbomachine 10 may comprise reversible power converters 32, 42 arranged between the first electric machine and the starter-generator 17 or the second electric machine 40 so as to reversibly transfer electrical power from one to the other. The power converters can be inverters or straighteners, depending on the motor or generator mode. The power converters can convert a three-phase alternative electric current.

According to an embodiment of the disclosure, the starter-generator 17 may comprise the starter-generator 16 which is configured to operate in starter mode and in generator mode.

The starter-generator 17 may also comprise a second electric machine 40 that is configured to operate in motor or generator mode. The second electric machine 40 may operate as a motor generator.

The control means may also be configured to control the second electric machine 40.

The first electric machine 30 and the second electric machine 40 may be arranged to transfer electrical power from one to the other.

Preferably, the first and second electric machines 30, 40, are asynchronous in alternative current.

The turbomachine 10 may comprise reversible power converters 32, 42 arranged between the first and second electric machines 30, 40 so as to reversibly transfer electrical power from one to the other. More specifically, the first electric machine 30 is connected to a first power converter 32, and the second electric machine 40 is connected to a second power converter 42, and the first and second power converters 32, 42 are connected together. Each electric machine 30, 40 operates in two quadrants, motor and generator.

The turbomachine 10 also comprises an epicyclic reduction gear train 50. The properties of the epicyclic reduction gear train are used to adapt the speed of rotation of the starter-generator 16.

FIGS. 5a, 5b and 5c show an epicyclic reduction gear train 50.

The epicyclic reduction gear train 50 comprises a central planetary gear 52A, arranged to be rotatable about the axis of the gearbox at a rotational speed, denoted ωA, and a planet carrier 52U arranged to be rotatable about the axis of the gearbox at a rotational speed, denoted ωU.

The epicyclic reduction gear train 50 also comprises planet gears 52S which mesh with the central planetary gear 52A and are carried by a planet carrier 52U.

The epicyclic reduction gear train 50 also comprises an external ring gear 52B arranged to be rotatable about the axis of the gearbox at a rotational speed, denoted ωB, and with which the planet gears 52S also mesh.

In the epicyclic reduction gear train 50, the three elements, namely the central planetary gear 52A, the planet carrier 52U and the ring gear 52B, are rotatable about the axis of the gearbox. For example, the ring gear 52B is free to rotate within a stationary casing 52C that is configured to protect the gearbox 50.

The operation of the epicyclic reduction gear train 50 is governed by the Willis formula. This is a two-degree-of-freedom mechanism, in which the knowledge of the rotational speeds of two elements among the central planetary gear 52A, the planet carrier 52U and the ring gear 52B, allows the calculation of the rotational speed of the third element.

The Willis formula is expressed by the following equations:

$$\frac{\omega A - \omega U}{\omega B - \omega U} = k \qquad \text{[Math 1]}$$

or $$\omega A - k \times \omega B + (k-1) \times \omega U = 0 \qquad \text{[Math 2]}$$

with ωA the rotational speed of the central planetary gear 52A, ωU the rotational speed of the planet carrier 52U, ωB the rotational speed of the ring gear 52B, and the factor k, also referred to as ratio, a constant determined by the geometry of the gears.

For the gearbox in FIG. 5, the factor k follows the following equation:

$$k = -\frac{ZB}{ZA} \qquad \text{[Math 3]}$$

where ZA is the number of teeth of the central planetary gear 52A and ZB is the number of teeth of the ring gear 52B. The factor k is therefore negative with a modulus less than 1.

The accessory gear box 12 is coupled to one of the three elements of the gearbox 50, the starter-generator 17 integrating the second machine 40, and more specifically the starter-generator 16, is coupled to a second element of the gearbox 50, and the first electric machine 30 is coupled to the third element of the gearbox 50 to control the speed of rotation of the latter.

According to the disclosure, the control means are configured to modify the rotational speed of the third element, i.e. the rotational speed ω30 of the first electric machine 30, so that the second element, i.e. the starter-generator 17 in generator mode, or the starter-generator 16 in generator mode, is driven in rotation at a constant speed.

In order to obtain a constant rotational speed of the starter-generator 17 in generator mode, or of the starter-generator 16 in generator mode, for a given rotational speed of the output shaft 14 of the accessory gear box 12, it is possible to vary the rotational speed of the third element of the gearbox 50.

According to the disclosure, the control means are configured to modify the rotational speed of the first electric machine 30 and the starter-generator 17, or the second electric machine 40, so as to provide the starter-generator 17 in starter mode with a maximum torque.

Six kinematic combinations are possible for positioning the three equipment, namely the accessory gear box 12, the starter-generator 17 integrating the second electric machine 40, or the starter-generator 16, and the first electric machine 30, relative to the three elements of the epicyclic reduction gear train 50.

The starter-generator 17, or the second electric machine 40, is also coupled to one of the elements of the gearbox 50. The second electric machine 40 may be positioned on the axis of the starter-generator 17 and form part of this starter-generator, or on the axis of the starter-generator 16, or on the axis of the accessory gear box.

The first electric machine 30 and the second electric machine 40 each comprise a stator and a rotor. The first and second electric machines 30, 40 are controllable in terms of the torque applied to their rotor and the rotational speed ω30, ω40 of their rotor. The torque and the speed of each electric machine 30, 40 are then controlled by the electrical power and the frequency of the current sent by the power converters 32, 42 dedicated to each.

Furthermore, the second electric machine 40 is electrically linked to the first electric machine 30 by means of the reversible power converters 32, 42 in order to transfer power from one to the other.

The position of the second electric machine 40 doubles the number of possible combinations for the driving device 20. This results in twelve combinations listed in the table below.

The table below also shows the function giving the rotational speed ω16 of the starter-generator 17 in generator mode, and more specifically that of the starter-generator 16 in generator mode, from the rotational speed ω12 of the output shaft 14 of the accessory gear box 12 and the rotational speed ω30 of the first electric machine 30. The rotational speed ω40 of the electric machine is determined by the rotational speed of the equipment with which it is coupled in series on the gearbox 50. In this table, the option 1 corresponds to cases where the starter-generator 17 in motor mode, or the second electric machine 40, is coupled in series with the starter-generator 17 in generator mode, or with the starter-generator 16, on the same element of the gearbox 50, and the option 2 corresponds to cases where the starter-generator 17 in motor mode, or the second electric machine 40, is coupled in series with the output shaft of the accessory gear box 12 on the same element of the gearbox 50.

This results in a torque at the level of the first electric machine 30, and thus a driving or generating power at the level of this machine depending on the direction of the speed and the torque.

The second electric machine 40 is placed in series with the starter-generator 16, or with the accessory gear box 12, and thereby the rotational speed ω40 of the second electric machine 40 is determined to be equal to that of this equipment.

Thus, the second electric machine 40 provides an additional degree of freedom to the driving device depending on the torque it exerts and which is in addition to that of the starter-generator 16 or the accessory gear box 12 on the corresponding element of the gearbox 50.

This additional degree of freedom is used to ensure a power transfer with the first electric machine 30.

Indeed, without the addition of the second electric machine 40, which allows the transfer of power with the first

TABLE 1

| Connection accesory gear box/starter-generator/first electric motor | | Speed starter-generator | Connection second electric machine | |
|---|---|---|---|---|
| Accesory gear box 12 connected to the planet carrier 52U | | | Option 1 | Option 2 |
| | First electric machine 30 | Starter-generator 17, 16 | | |
| 1A | Ring gear 52B | Planetary gear 52A | $\omega 16 = (1 - k) \times \omega 12 + k \times \omega 30$ | Planetary gear 52A | Planet carrier 52U |
| 1B | Planetary gear 52A | Ring gear 52B | $\omega 16 = -\omega 12 \times \frac{1-k}{k} + \frac{\omega 30}{k}$ | Ring gear 52B | Planet carrier 52U |
| Accesory gear box 12 connected to the ring gear 52B | | | Option 1 | Option 2 |
| | First electric machine 30 | Starter-generator 17, 16 | | |
| 2A | Planet carrier 52U | Planetary gear 52A | $\omega 16 = k \times \omega 12 + (1 - k) \times \omega 30$ | Planetary gear 52A | Ring gear 52B |
| 2B | Planetary gear 52A | Planet carrier 52U | $\omega 16 = -\omega 12 \times \frac{k}{1-k} + \frac{\omega 30}{1-k}$ | Planet carrier 52U | Ring gear 52B |
| Accesory gear box 12 connected to the planetary gear 52A | | | Option 1 | Option 2 |
| | First electric machine 30 | Starter-generator 17, 16 | | |
| 3A | Ring gear 52B | Planet carrier 52U | $\omega 16 = \frac{\omega 12}{1-k} - \omega 30 \times \frac{k}{1-k}$ | Planet carrier 52U | Planetary gear 52A |
| 3B | Planet carrier 52U | Ring gear 52B | $\omega 16 = \frac{\omega 12}{k} - \omega 30 \times \frac{1-k}{k}$ | Ring gear 52B | Planetary gear 52A |

The torques provided by the accessory gear box 12, the starter-generator 16 or the starter-generator 17 integrating the second electric machine 40, and the first electric machine 30 are related by an expression of balance of the train.

In particular, a study of the gearbox 50 allows to obtain the following balance relationship of the train and power balance relationship:

$$CA + CB + CU = 0 \quad \text{[Math 4]}$$

$$\omega A \times CA + \omega B \times CB + \omega U \times CU = 0 \quad \text{[Math 5]}$$

where CA is the torque acting on the planetary gear 52A, CB is the torque acting on the ring gear 52B, CU is the torque acting on the planet carrier 52U, ωA is the rotational speed of the central planetary gear 52A, ωB is the rotational speed of the ring gear 52B and ωU is the rotational speed of the planet carrier 52U.

electric machine 30, the power drawn from the axis of the accessory gear box 12 would in certain phases of flight of the turbomachine be less than the electrical power provided by the starter-generator 16 and in certain phases of flight of the turbomachine greater than the requirements of the phase of flight.

In the case of an electrical power provided by the starter-generator 16 in generator mode being greater than the power drawn from the accessory gear box 12, the power gain comes from the electrical power drawn by the first electric machine 30 in motor mode.

In the event that an electrical power provided by the starter-generator 16 in generator mode is less than the power drawn from the accessory gear box 12, the power loss is drawn by the first electric machine 30 in generator mode.

The battery of the first electric machine 30 allows to recover electrical power during the generating phases and to restore this electrical power during the driving phases. The control mode of the first electric machine 30 allows it to operate in all four quadrants, in terms of torque and speed.

The overall energy drawn from the accessory gear box 12 during the entire flight phase is then the electrical energy provided by the starter-generator 16 in generator mode.

The approximate balance between the driving energy and the generating energy results in an optimization of the parameters, such as the ratio k of the epicyclic gear train of the gearbox 50 and the input rotational speed on the side of the accessory gear box 12.

Indeed, the driving device 20 depends on several parameters including: the ratio k of the epicyclic gear train of the gearbox 50, the ratio of the rotational speed $\omega 12$ at the output of the accessory gear box 12 with respect to the rotational speed of the engine axis of the turbomachine and the maximum value of the rotational speed $\omega 16$ of the starter-generator 16 in generator mode.

A choice among the twelve configurations can be made by optimizing these parameters to achieve in particular the following objectives:

having a speed of the starter-generator 16 higher than the speed of the accessory gear box 12;
reducing the torque of the first electric machine 30 for optimizing the size of the motor;
having the speed of the first electric machine 30 as high as possible;
having the highest possible speed of the second electric machine 40; and
optimizing the power transfers between the first electric machine 30 and the second electric machine 40 when operating the starter-generator 16 in generator mode.

Not all combinations in Table 1 will allow to achieve these objectives.

A specific optimization study of each combination is therefore necessary to motivate a choice of implementation on a turbomachine. The combinations described below present various advantages to be considered for an integration in a turbomachine.

FIG. 1a illustrates the "1B-Option 1" configuration in which the accessory gear box 12 is connected to the planet carrier 52U, the starter-generator 17 integrating the second electric machine 40 is connected to the ring gear 52B, and the first electric machine 30 is connected to the central planetary gear 52A.

Figure 1B:
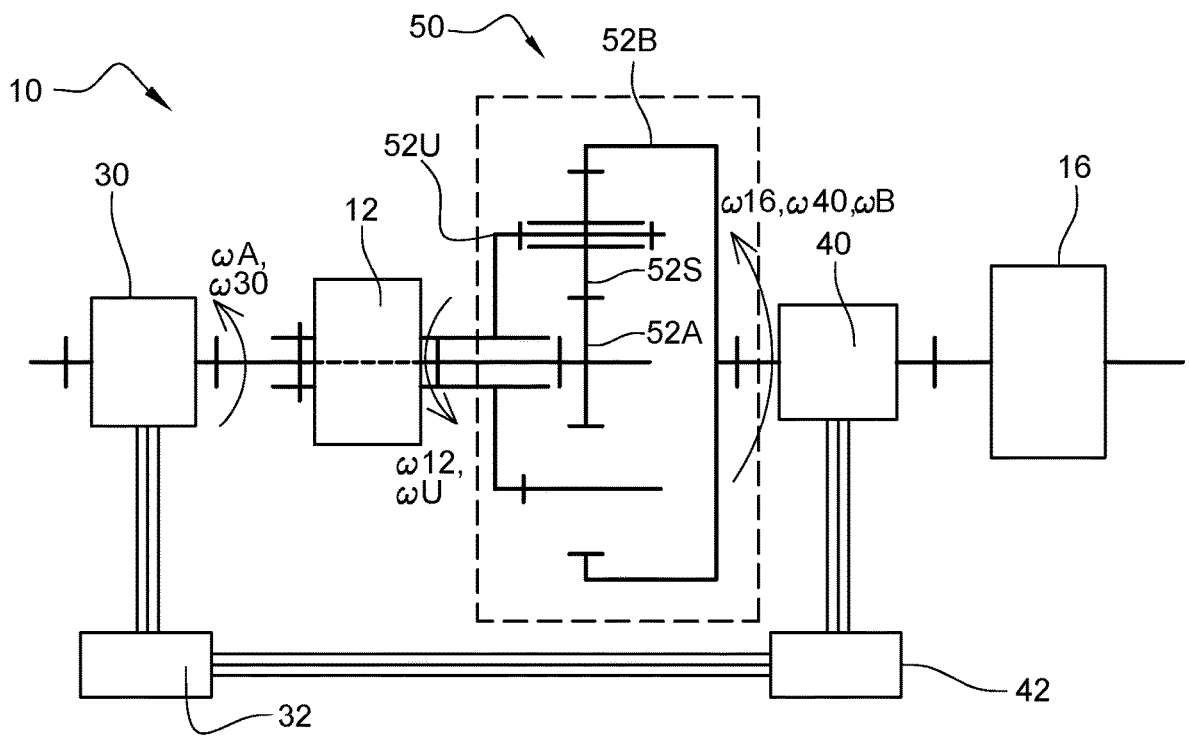

FIG. 1b illustrates the "1B-Option 1" configuration in which the accessory gear box 12 is connected to the planet carrier 52U, the starter-generator 16 is connected to the ring gear 52B, and the first electric machine 30 is connected to the central planetary gear 52A. In this configuration, the second electric machine 40 is connected to the ring gear 52B.

These configurations allow to meet the following constraints:

rotational speed $\omega 16$ of the starter-generator 17 integrating the second electric machine 40, or of the starter-generator 16, higher than the rotational speed $\omega 12$ of the accessory gear box 12, in particular due to the connection of the starter-generator 16 to the ring gear 52B;
reduction of the torque of the first electric machine 30 for the optimization of the size of the motor, in particular thanks to the connection of the first electric machine 30 to the planetary gear 52A;
the highest possible rotational speed $\omega 30$ of the first electric machine 30, in particular by connecting the first electric machine 30 to the planetary gear 52A; and
rotational speed $\omega 40$ of the starter-generator 17 in motor mode, or of the second electric machine 40, as high as possible, in particular by connecting the starter-generator 17 in motor mode or the second electric machine 40 to the ring gear 52B.

In these configurations, the control of the first electric machine 30 and the starter-generator 17 in motor mode, or of the second electric machine 40, is achieved through inverter-straightener 32, 42.

Figure 2:
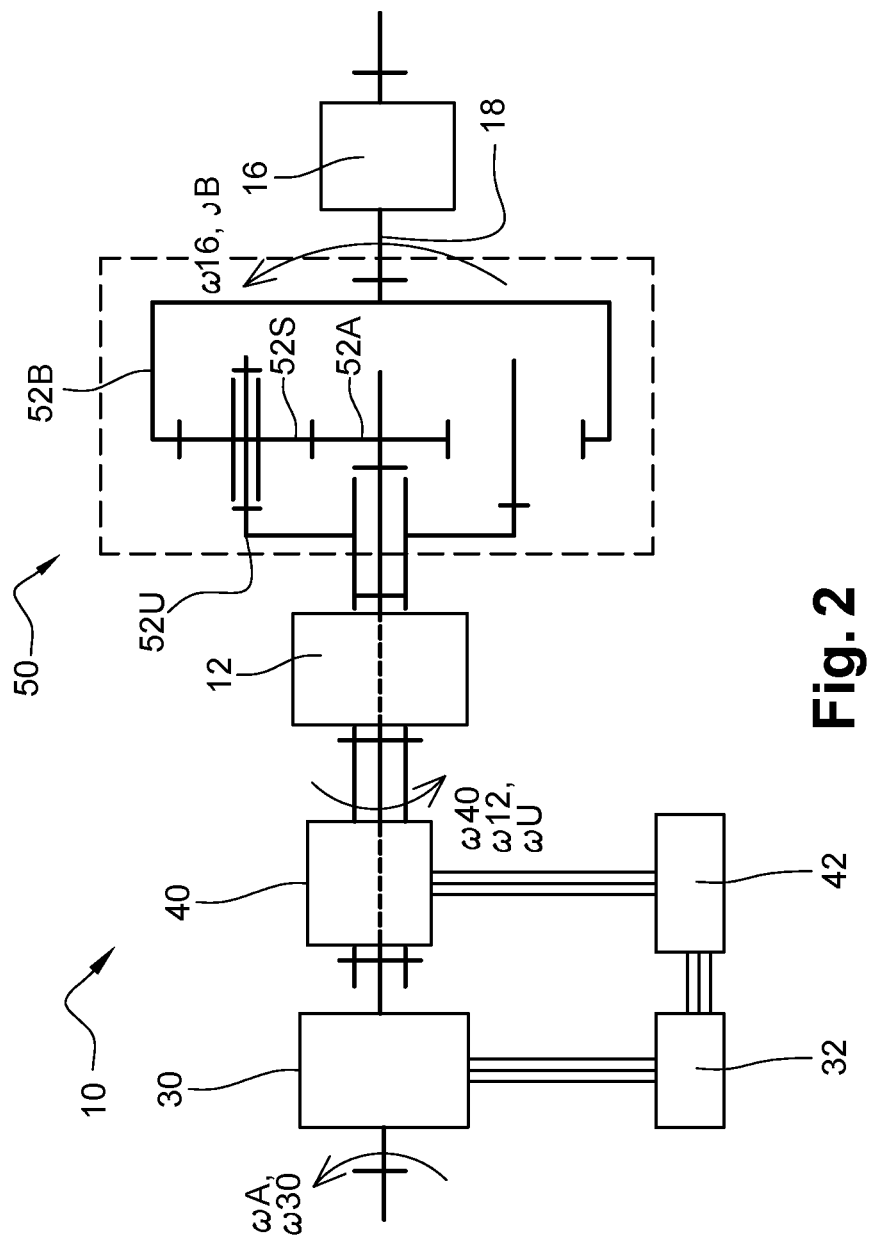
FIG. 2 represents very schematically a kinematic configuration of a turbomachine according to a second embodiment of the disclosure.

FIG. 2 illustrates the "1B-Option 2" configuration in which the accessory gear box 12 is connected to the planet carrier 52U, the starter-generator 16 is connected to the ring gear 52B, and the first electric machine 30 is connected to the central planetary gear 52A. In this configuration, the second electric machine 40 is connected to the planet carrier 52U.

This configuration allows to meet the following constraints:

rotational speed $\omega 16$ of the starter-generator 16 higher than the rotational speed $\omega 12$ of the accessory gear box;
reducing the torque of the first electric machine 30 to optimize the size of the motor; and rotational speed $\omega 30$ of the first electric machine 30 as high as possible.

In this configuration, the control of the second electric machine 40 comprises a torque and speed control loop, the second electric machine 40 and the accessory gear box 12 being connected to the same element of the gearbox 50.

The choice of positioning the second electric machine 40 on the axis of the starter-generator 16 (configuration "1B-Option 1") or on the axis of the accessory gear box 12 (configuration "1B-Option 2") depends on the application, and mainly on the layout and the cluttering of the equipment, and on the maximum speed of the turbomachine 10 and the maximum speed of the starter-generator 16, which is delimited by the maximum torque, and thus by the maximum power.

Other architectures are not necessarily incompatible with the application. The choice of the configuration depends on the power levels of the considered application.

A choice among the twelve configurations can be made by optimizing these parameters to achieve in particular the following objectives:

having a speed of the starter-generator 16 lower than the speed of the accessory gear box 12;
reducing the torque of the first electric machine 30 for optimizing the size of the motor;
having the speed of the first electric machine 30 as high as possible;
having the speed of the second electric machine 40 as high as possible;
optimizing the power transfers between the first electric machine 30 and the second electric machine 40 when operating the starter-generator 16 in generator mode.

The choice of the speed of the starter-generator below or above the speed of the accessory gear box depends on the maximum speed of the accessory gear box, as the maximum speed of the starter-generator is limited by the torque to be developed.

Figure 3A:
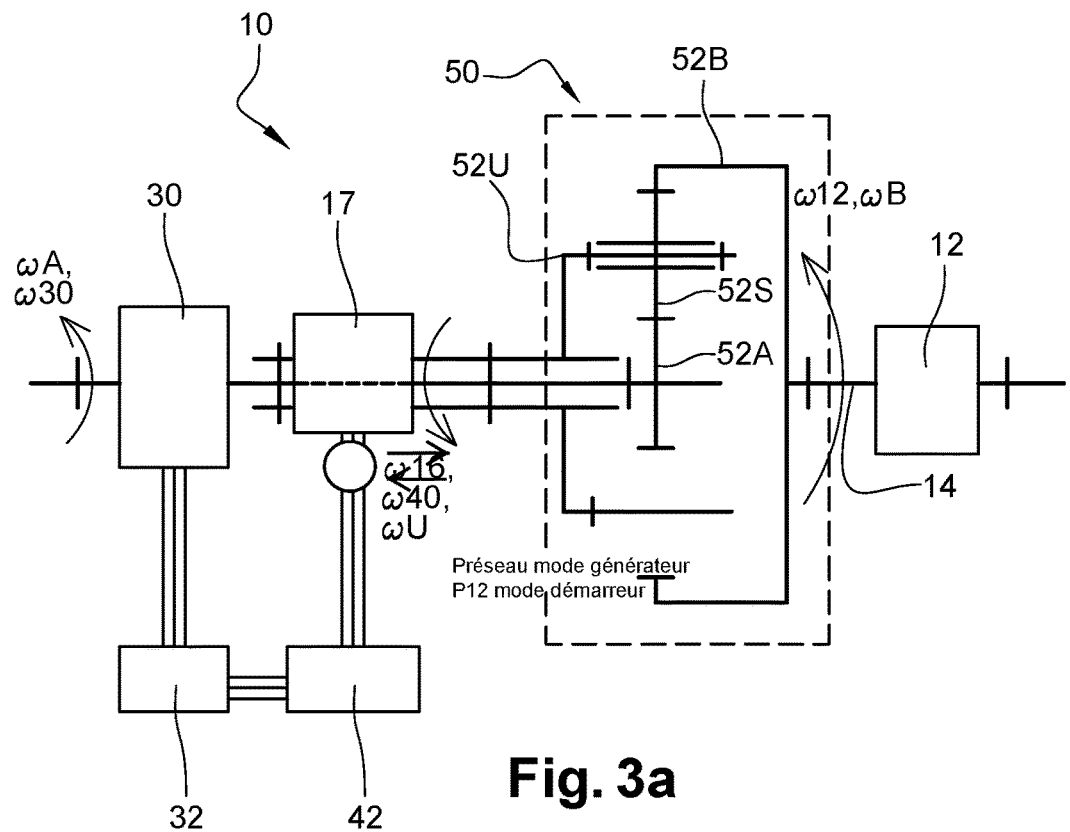
FIGS. 3a and 3b represent very schematically different kinematic configurations of a turbomachine according to a fourth embodiment of the disclosure.

FIG. 3a illustrates the "2B-Option 1" configuration in which the accessory gear box 12 is connected to the ring gear 52B, the starter-generator 17 integrating the second electric machine 40 is connected to the planet carrier 52U, and the first electric machine 30 is connected to the central planetary gear 52A.

Figure 3B:
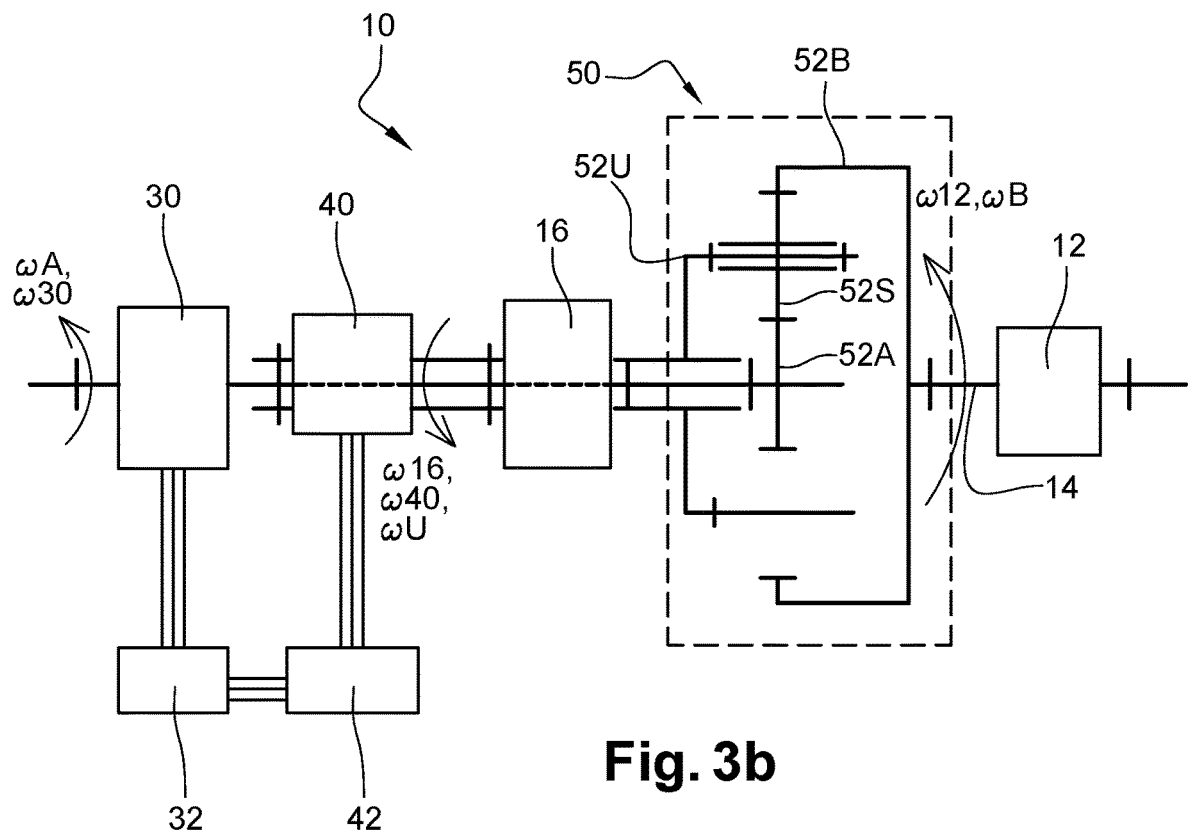

FIG. 3b illustrates the "2B-Option 1" configuration in which the accessory gear box 12 is connected to the ring gear 52B, the starter-generator 16 is connected to the planet carrier 52U, and the first electric machine 30 is connected to the central planetary gear 52A. In this configuration, the second electric machine 40 is connected to the planet carrier 52U.

Figure 4:
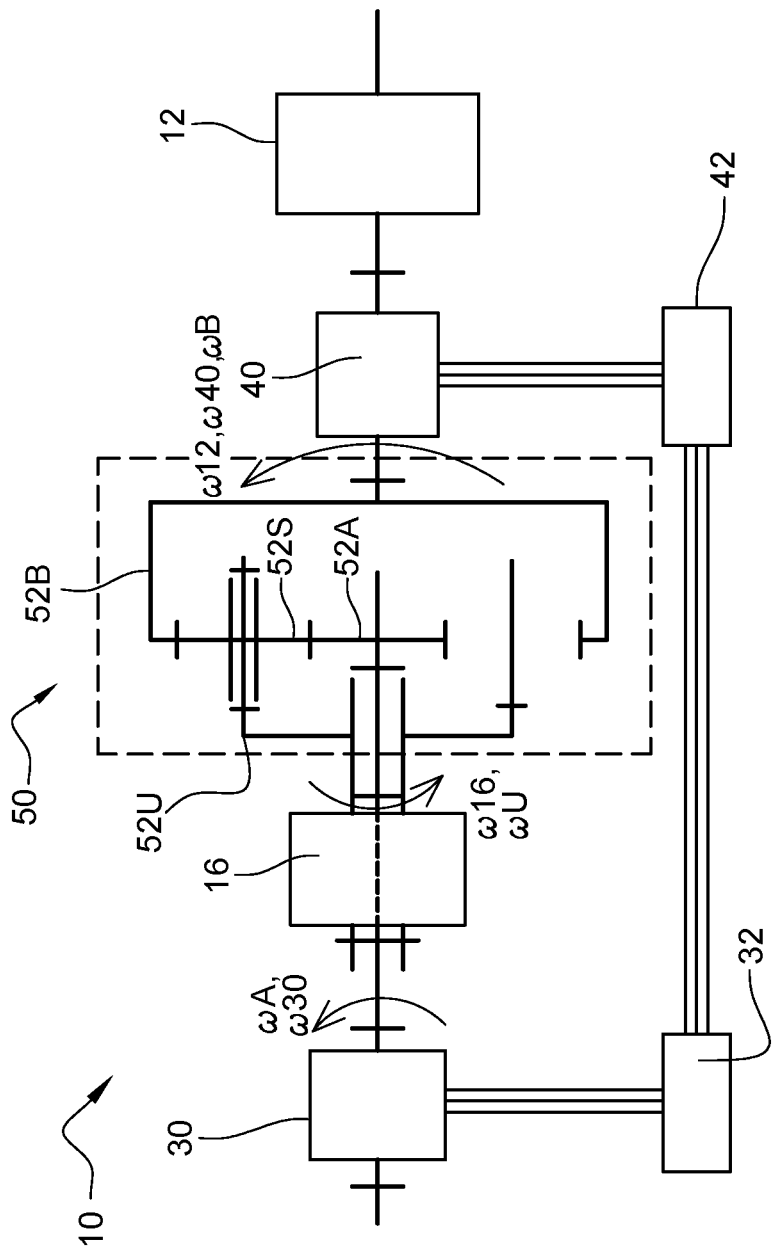
FIG. 4 represents very schematically a kinematic configuration of a turbomachine according to a third embodiment of the disclosure.

FIG. 4 illustrates the "2B-Option 2" configuration in which the accessory gear box 12 is connected to the ring gear 52B, the starter-generator 16 is connected to the planet carrier 52U, and the first electric machine 30 is connected to the central planetary gear 52A. In this configuration, the second electric machine 40 is connected to the ring gear 52B.

In the configuration 1B, Option 1 or Option 2, the lack of loss is due to the transfer of electrical power. Indeed, the first electric machine 30 may recover energy in generator mode through the epicyclic reduction gear train 50 and return it to the second electric machine 40, or recover energy from the second electric machine 40 and return it in motor mode to the epicyclic reduction gear train 50.

The maximum power is obtained by the starter-generator 17 in generator mode or by the starter-generator 16 in generator mode. In general, this maximum power, noted Pg_max, is drawn off in generator mode, and is about ⅓ of the maximum power provided in starter mode, noted Pd_max. These powers are related by the following equation:

$$Pg\_max = \tfrac{1}{3} Pd\_max \qquad \text{[Math 6]}$$

where Pg_max is the maximum power obtained by the starter-generator 17 integrating the second electric machine 40 in generator mode or by the starter-generator 16 in generator mode and Pd_max is the maximum power provided by the starter-generator 17 integrating the second electric machine 40 in starter mode or by the starter-generator 16 in starter mode,
and with $$Pd\_max = Cd\_max * \frac{\omega d_{max}}{2} \qquad \text{[Math 7]}$$

where Cd_max is the maximum torque achieved by the starter-generator 17 integrating the second electric machine 40 in starter mode or by the starter-generator 16 in starter mode and ωd_max is the maximum rotational speed achieved by the starter-generator 17 integrating the second electric machine 40 in generator mode or by the starter-generator 16 in generator mode.

The maximum rotational speeds in generator mode and in starter mode are related by the following equation:

$$\omega g\_max = \omega d\_max * 2 \qquad \text{[Math 8]}$$

with ωg_max the maximum rotational speed achieved by the starter-generator 17 integrating the second electric machine 40 in generator mode or by the starter-generator 16 in generator mode and ωd_max the maximum rotational speed provided by the starter-generator 17 integrating the second electric machine 40 in starter mode or by the starter-generator 16 in starter mode.

The table below lists the operating requirements for the starter-generator 16 in both starter mode and generator mode. In this table, ω12_max is the maximum rotational speed of the output shaft of the accessory gear box.

TABLE 2

| Level of speed | Speed | Power | Starter-generator in starter mode Speed | Torque | Starter-generator in generator mode Speed | Torque |
|---|---|---|---|---|---|---|
| Start of the startup | | 0 | 0 | Cd_max | | |
| Maximum torque at startup | $\frac{\omega 12\_max}{4}$ | Pd_max | $\frac{\omega g\_max}{2}$ | Cd_max | | |
| Cut-off | $\frac{\omega 12\_max}{2}$ | Pd_max | ωd_max | $\frac{Cd\_max}{2}$ | | |
| Start of the generator | $\frac{\omega 12\_max}{2}$ | Pg_max | | | ωd_max | $\frac{Cd\_max}{2}$ |
| Reignition | ¾ ω12_max | Pg_max | | | 3/2 ωd_max | $\frac{Cd\_max}{2}$ |
| Cruise | ¾ ω12_max | Pg_max | | | 3/2 ωd_max | $\frac{Cd\_max}{2}$ |
| Maximal speed | ω12max | Pg_max | 2*ωd_max | | ωg_max | $\frac{Cd\_max}{3}$ |

In generator mode, the rotational speed of the starter-generator 16 varies between ωg_max/2 and ωg_max, i.e. in a ratio of 2 without the first electric machine 30 allowing its speed to be adjusted to a constant value.

The differential driving device integrates the first electric machine 30 which controls the constant output speed of the starter-generator 16 in generator mode for an input speed at the side of the accessory gear box 12. Here, the constant output rotational speed of the starter-generator 16 in generator mode is equal to the average value of its output speed, i.e. ωd_max*3/2. The maximum speed of the starter-generator 16 in generator mode does not exceed this value.

With the first electric machine 30, the variability on the fixed reduction ratio between the axis of the starter-generator 16 and the axis of the turbomachine is +/−50%. This ratio is fixed by the ratio between ωd_max*3/2 and the speed ω12_max*¾.

In operation the epicyclic reduction gear train 50 behaves in three different ways.

First, if the speed of the shaft 14 of the accessory relay case 12 is such that the speed of the starter-generator 16 in generator mode corresponds to the value of the constant speed, the driving speed of the first electric machine 30 is zero, and the speed of the starter-generator 16 is related to the speed of the shaft 14 of the accessory gear box 12 by the reduction ratio of the epicyclic gear train at the zero speed of the first electric machine 30.

Secondly, if the speed of the shaft 14 of the accessory gear box 12 is such that the speed of the starter-generator 16 in generator mode is greater than the value of the constant speed, the first electric machine 30 is controlled to operate in a certain direction of rotation in generator mode to reduce the speed of the starter-generator 16. The recovered energy is then returned to the second electric machine 40 operating in motor mode. The energy recovered and restored allows the entire power restored by the shaft of the turbomachine to be drawn off at the level of the starter-generator without dissipative loss.

When the first electric machine 30 is operated in motor mode, the powers and the torques follow the following relationships:

$$P16=PT+\text{PDifferentialOutput}=P12 \qquad \text{[Math 9]}$$

where P16 is the power of the starter-generator, PT is the transfer power between the first electric machine 30 and the second electric machine 40, PDifferentialOutput is the output power of the epicyclic reduction gear train 50 and P12 is the power of the accessory gear box 12.

$$Cg=C40+\text{CDifferentialOutput} \qquad \text{[Math 10]}$$

where Cg is the torque of the starter-generator in generator mode, C40 is the torque of the second electric machine 40 and CDifferentialOutput is the output torque of the epicyclic reduction gear train 50.

The power transferred between the first and second electric machines 30, 40 is equal to 50% of the power of the starter-generator 16 in generator mode, noted Pg.

The maximum torque of the second electric machine 40 positioned on the axis of the starter-generator 16 follows the following equation:

$$Pd\_max * \frac{3}{2} * \frac{\frac{1}{2}}{\omega d\_max * \frac{3}{2}} = \frac{Cd\_max}{4} \qquad \text{[Math 11]}$$

with Pd_max the maximum power of the starter-generator 16 in starter mode, ωd_max the maximum rotational speed of the starter-generator 16 in starter mode and Cd_max the maximum torque of the starter-generator 16 in starter mode. The maximum torque recovered by the starter-generator 16 in generator mode is equal to Cd_max/4.

The maximum torque of the first electric machine 30 positioned on the planetary gear 52A is equal to k*Cd/4, where k is the ratio of the train.

The choice of the ratio k of the gear train and of the constant rotational speed of the starter-generator 16 in generator mode are two parameters which are adapted so that, in starter mode, the maximum torque developed by the starter-generator 16 and the second electric machine 40 in motor mode positioned on the axis of the starter-generator 16, as well as the torque of the second electric machine 40 in motor mode on the planetary gear 52A, allow to develop the maximum torque required at the level of the axis of the turbomachine during the starting phase.

As the size of a starter-generator 17 is mainly conditioned by the torque to be developed, it is necessary not to exceed the size of a generator configured to developing the torque Cd_max/2, that torque value which would have conditioned the size of the generator.

Third, if the speed of the shaft 14 of the accessory gear box 12 is such that the speed of the starter-generator 16 is less than the requirements of the turbomachine 10, the first electric machine 30 is controlled to operate in the other direction of rotation in motor mode to increase the speed of the starter-generator 16. The energy returned to the first electric machine 30 is derived from the energy recovered from the second electric machine 40 operating in generator mode.

The power drawn from the accessory gear box 12 is converted integrally into power provided by the starter-generator 16 in generator mode. The absence of loss results from this transfer of electrical power: either the first electric machine 30 recovers energy in generator mode through the epicyclic reduction gear train 50 and returns it to the second electric machine 40, or recovers energy from the second electric machine 40 and returns it in motor mode to the epicyclic reduction gear train 50.

Depending on the design and the technology of the electric machines, preferably asynchronous, the redundancy of the electric machines to ensure a high reliability has a little impact on the size of the electric machines.

The starter-generator 17 integrating the second electric machine 40 which provides the electrical power is dimensioned for a power, noted P17, equal to the sum of the power of the electric machine 40, i.e. the transfer power PT, and the power of the accessory gear box, noted P12. This starter-generator therefore has a mass that is fairly close to the sum of the mass of the second electric machine 40 and the mass of the starter-generator 16.

Indeed, if the speed of the shaft of the accessory gear box 12 is such that the speed of the starter-generator 16 in generator mode is lower than the requirements of the turbomachine, the first electric machine 30 in motor mode recovers a driving power from the starter-generator 17 integrating the second electric machine 40.

The powers then follow the following equation:

$$P\text{network}=P17-PT=(P12+PT)-PT=P12 \qquad \text{[Math 12]}$$

where Pnetwork is the power of the network of the turbomachine, P17 is the power of the starter-generator 17 integrating the second electric machine 40, PT is the transfer power between the first electric machine 30 and the starter-generator 17 integrating the second electric machine 40, and P12 is the power of the accessory gear box 12.

The power P17 of the starter-generator 17 integrating the second electric machine 40 is therefore greater than the power drawn off at the level of the accessory gear box 12.

On the other hand, the resulting power Pnetwork recovered for the network is equal to the power of the accessory gear box 12.

During the starting phase, the first and second electric machines 30, 40 operate in motor mode and the starter-generator 16 in starter mode drives the axis of the turbomachine, as well as the accessories. The power collected at the level of the axis of the turbomachine is the resultant of the power supplying the starter-generator 16 in starter mode, the power supplying the second electric machine 40 and the power supplying the first electric machine 30. The powers follow the following relationship:

$$P12=2*PT+Pd \qquad \text{[Math 13]}$$

where P12 is the power of the accessory gear box, PT is the transfer power between the first and second electric machines 30, 40 and Pd is the power of the starter-generator 16 in starter mode.

The power supplied to the starter-generator 17 integrating the second electric machine 40 follows the following relationship:

$$P17=Pd+PT=P12-PT \qquad \text{[Math 14]}$$

where P17 is the power of the starter-generator 17 integrating the second electric machine 40, Pd is the power of the starter-generator 16 in starter mode, PT is the transfer power between the first electric machine 30 and the starter-generator 17 integrating the second electric machine 40, and P12 is the power of the accessory gear box 12.

The choice of the ratio k of the train, the configuration of the differential and the constant speed of the starter-generator 16 in generator mode allows the maximum torque required at the level of the axis of the turbomachine to be achieved.

Furthermore, this differential driving mode between the turbomachine and the starter-generator 16 is compatible with an operation of the starter-generator 16 in a power split starter mode, due to the presence of the first electric machine 30 on the planetary gear 52A.

The starter-generator 16 is supplied with a constant power and the first electric machine 30 draws some power at low speeds to increase the torque at the startup by about 50%.

The disclosure also relates to a method for controlling the speed of a starter-generator of a turbomachine 10 as described above.

The method comprises a step of modifying the speed of the third of the three elements by controlling the first electric machine 30 by means of the control means so that the starter-generator 17 integrating the second electric machine 40 in generator mode or the starter-generator 16 is driven in rotation at a constant speed. In particular, the speed of the first electric machine 30 is adapted to the speed of the output shaft of the accessory gear box 12 so that the speed of the starter-generator 17 integrating the second electric machine 40 in generator mode or of the starter-generator 16 is constant.

The method may also comprise a step of modifying the rotational speed of the first electric machine 30 and the starter-generator 17 in motor mode, or the second electric machine 40, so as to provide the starter-generator 17 integrating the second electric machine 40 in starter mode with a maximum torque of the first electric machine 30 and a maximum torque of the starter-generator 17 integrating the second electric machine 40 in motor mode, or the second electric machine 40.

The invention claimed is:

1. A turbomachine for an aircraft, comprising:
   an accessory gear box,
   a first electric machine,
   a starter-generator integrating a second electric machine configured to operate in starter mode and in a generator mode, said first electric machine and said starter-generator integrating the second electric machine being arranged to transfer electrical power from one to the other,
   control electronic means configured to control said first electric machine and the starter-generator integrating the second electric machine, by controlling the electrical power and a frequency of a current sent to said first electric machine and the starter-generator integrating the second electric machine, and
   an epicyclic reduction gear train comprising three elements, a central planetary gear, an external ring gear and a planet carrier whose planet gears mesh with said planetary gear and said external ring gear, said three elements being rotatable about an axis of the epicyclic reduction gear train, a first of said three elements being intended to be coupled to the accessory gear box, a second of said three elements being intended to be coupled to the starter-generator integrating the second electric machine, a third of said three elements being driven in rotation by said first electric machine,
   wherein said control electronic means are configured to modify a speed of rotation of the first electric machine and a speed of rotation of the starter-generator integrating the second electric machine to provide the starter-generator in the starter mode with a maximum torque, and
   wherein said control electronic means are configured to modify the speed of rotation of the first electric machine so that said starter-generator in the generator mode is driven in rotation at a constant speed.

2. The turbomachine according to claim 1, wherein the starter-generator integrating the second electric machine is configured to operate in the starter mode and in the generator mode, and the second electric machine is configured to operate in a motor mode, wherein the first and second electric machines are arranged to transfer electrical power from one to the other, wherein the control electronic means are configured to modify the speed of rotation of the first electric machines and the speed of rotation the starter-generator integrating the second electric machine so as to provide the starter-generator in the starter mode with a maximum torque of said first and second electric machines, and wherein said control electronic means are configured to modify the speed of rotation of the first electric machine so that the starter-generator in the generator mode is driven in rotation at a constant speed.

3. The turbomachine according to claim 2, wherein the first and second electric machines are motor-generators.

4. The turbomachine according to claim 1, further comprising at least one reversible power converter arranged between said first electric machine and said starter-generator integrating the second electric machine to transfer electrical power reversibly from one to the other.

5. The turbomachine according to claim 1, wherein the first electric machine and the starter-generator integrating the second electric machine are asynchronous.

6. The turbomachine according to claim 1, wherein the first of the three elements is the planet carrier, the second of said three elements is the external ring gear, and the third of said three elements is the planetary gear.

7. The turbomachine according to claim 1, wherein the first of the three elements is the external ring gear, the second of said three elements is the planet carrier, and the third of said three elements is the planetary gear.

8. The turbomachine according to claim 2, wherein the second of said three elements is coupled to the starter-generator integrating the second electric machine, and wherein the first of the three elements is the planet carrier, the second of said three elements is the external ring gear, and the third of said three elements is the planetary gear, and wherein the first of said three elements is also coupled to said second electric machine.

9. The turbomachine according to claim 2, wherein the second of said three elements is coupled to the starter-generator integrating the second electric machine, and wherein the first of said three elements is the external ring gear, the second of said three elements is the planet carrier, and the third of said three elements is the planetary gear, and wherein the first of said three elements is also coupled to said second electric machine.

10. A method for controlling the speed of a starter-generator of a turbomachine according to claim 1 in an aircraft, comprising a step of modifying a speed of the third of the three elements by controlling the first electric machine by the control electronic means so that the starter-generator integrating the second electric machine in the generator mode is driven in rotation at the constant speed.

* * * * *